United States Patent [19]
Cipolla et al.

[11] Patent Number: 6,010,252
[45] Date of Patent: Jan. 4, 2000

[54] SHUTTER MECHANISM

[75] Inventors: David Cipolla, Macedon; Mark A. Lamphron, Rochester, both of N.Y.

[73] Assignee: Eastman Kodak Company, Rochester, N.Y.

[21] Appl. No.: 09/137,737

[22] Filed: Aug. 21, 1998

[51] Int. Cl.[7] .................................................. G03B 9/10
[52] U.S. Cl. ............................................................ 396/493
[58] Field of Search .................................. 396/493, 494, 396/452, 439

[56] References Cited

U.S. PATENT DOCUMENTS

| | | | |
|---|---|---|---|
| 3,661,066 | 5/1972 | Ettischer et al. | 396/494 X |
| 3,672,285 | 6/1972 | Stoneham . | |
| 5,181,057 | 1/1993 | Takagi et al. . | |

FOREIGN PATENT DOCUMENTS

| | | |
|---|---|---|
| 2-105127 | 4/1990 | Japan . |
| 3-114823 | 11/1991 | Japan . |
| 6-82878A | 3/1994 | Japan . |
| 6-82976 | 3/1994 | Japan . |

*Primary Examiner*—W. B. Perkey
*Attorney, Agent, or Firm*—Svetlana Z. Short

[57] ABSTRACT

A shutter mechanism for a camera having an integrally molded plastic frame is provided. The shutter mechanism includes a high energy lever (HEL) having an arm rotatably mounted to the camera frame, and a finger projecting from an end of the arm that moves across an arcuate path when the lever arm rotates; a shutter blade pivotally mounted on the frame having a lever portion for pivoting a masking portion into an exposure position when struck by the finger of the HEL, and a retainer including a wall that is integrally connected to the camera frame for retaining the finger of the lever in a shutter-striking arcuate path when the arm rotates. The length of the lever arm is relatively short relative to the length of the projecting finger that strikes the shutter blade in order to eliminate unwanted flexing of the high energy lever during an exposure operation. The guidance that the integrally connected retainer wall provides to the lever finger, in combination with the short length of the HEL arm relative to its finger increases the accuracy and reliability of the shutter operation.

20 Claims, 4 Drawing Sheets

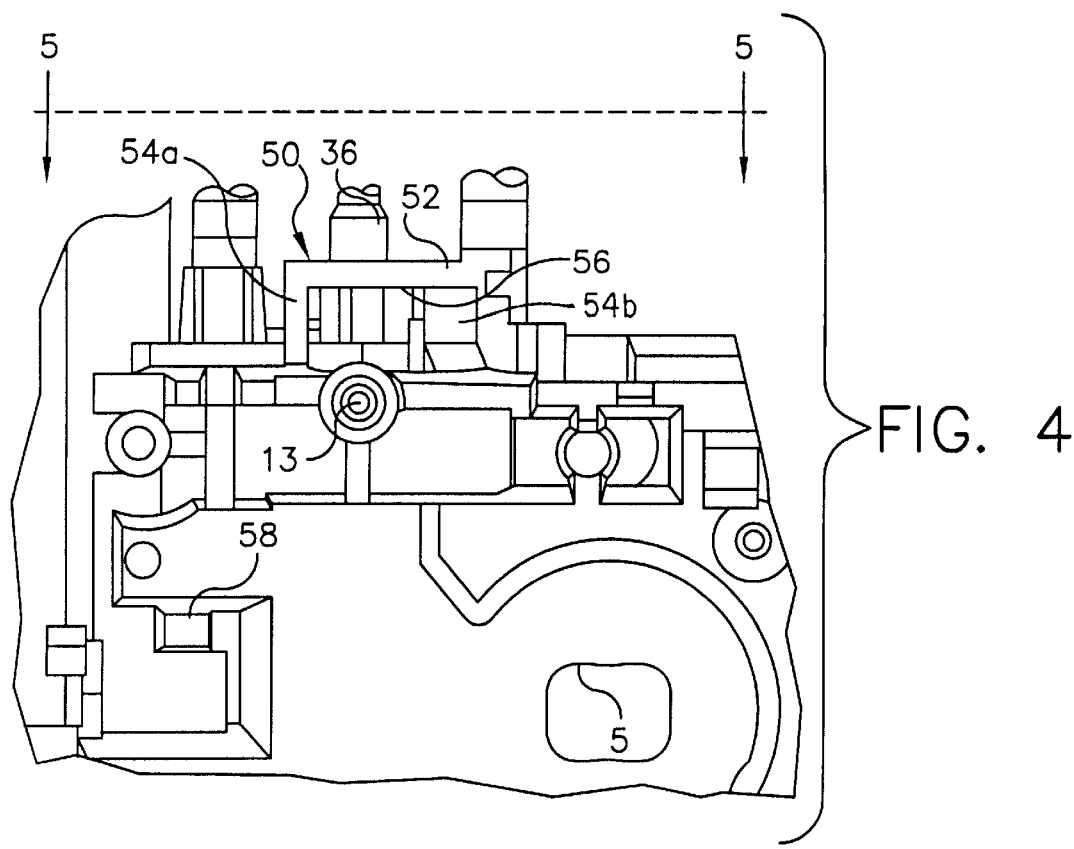
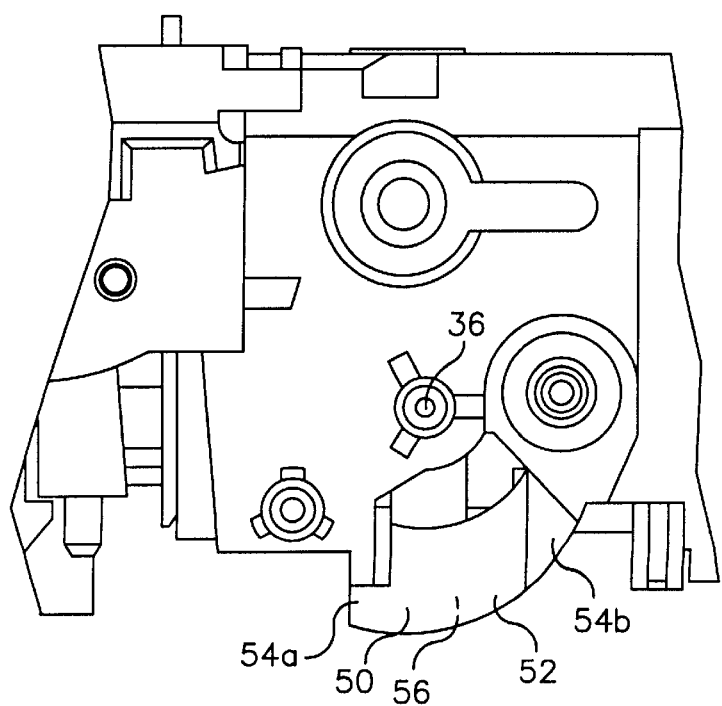
FIG. 4
FIG. 5

SHUTTER MECHANISM

CROSS-REFERENCE TO RELATED APPLICATIONS

Cross-reference is made to commonly assigned, copending U.S. application Ser. No. 09/137,718 (Attorney Docket 7831 8SZS) entitled "Shutter Mechanism For Cameras" filed concurrently herewith.

FIELD OF THE INVENTION

This invention relates to a shutter mechanism for use in a photographic camera and more specifically to a shutter mechanism that includes a high energy lever.

BACKGROUND OF THE INVENTION

In order to make a photographic exposure with a camera, a camera housing is provided with an exposure aperture through which light can pass to expose film in the camera. A shutter blade normally closes this aperture to prevent the undesired entry of light through the aperture. The shutter blade is actuated by a shutter mechanism to open the aperture for a predetermined period of time to admit light through the aperture. The shutter mechanism must operate to a high degree of accuracy and reliability if the film is to be exposed properly. Not only must the aperture be opened for the correct total amount of time for proper exposure, but the movement of the shutter blade must be such that this exposure is uniform across the entire area of the film. For example, a shutter blade which sticks or drags slightly across part of its stroke can result in parts of the same film exposure being overexposed and underexposed (known as "shadowing" in the art), even when the average amount of light striking the film over the exposure time is within proper limits.

The necessity for a carefully controlled shutter operation exists in simple, inexpensive cameras as well as in the more sophisticated cameras, and the designer of the simple camera must provide an uncomplicated but accurate and reliable shutter mechanism if the costs of manufacture are to be minimized.

A type of a shutter mechanism commonly used on lower priced cameras includes a pivotable shutter blade which is mounted on a post. The shutter blade pivots between two positions—an aperture closed position and an aperture open position. Such shutters are of the "impact" variety, and are pivotable in response to the release of a spring driven finger which strikes a short lever on one side of the shutter blade to pivot it momentarily into the open position. A return spring is used to bias the shutter blade towards the closed position.

Japanese laid open patent application (Kokai) No. 6-82976 discloses a shutter mechanism of the "impact" variety. Here, a drive mechanism that includes a high energy lever (HEL) strikes a lever on one end of the shutter forcing the shutter blade to pivot into the open position. The high energy lever (HEL) is formed from an arm connected at one end to a finger for striking the lever on one side of the shutter blades. The opposite end of the arm is connected to a bushing rotatably mounted onto a post. The bushing is spring loaded via a torsion spring. When the torsion spring is released by pushing the shutter button, the finger of the HEL sweeps across an arc that strikes the lever of the shutter blade.

While the mechanism disclosed in the '976 patent application is capable of performing its intended function, the inventors have observed several shortcomings in its design that can lead to operational unreliabilities. For example, because the finger of the HEL is supported by a lens mounting plate which is separately installed onto the body of the camera during manufacture, these two parts must be assembled with a high degree of precision if the HEL is to be effectively supported in its proper position throughout its arcuate stroke. Because the arm and the finger of the HEL are relatively long and formed from flexible plastic materials, their cumulative manufacturing tolerances and the manufacturing tolerances on the lens plate may result in a positioning of the finger of the HEL slightly higher or lower than its intended position, resulting again in either no support or excessive friction. Worse yet, the manufacturing and assembly tolerances may add up to the extent where the finger of the HEL sweeps over the lever of the shutter blades without striking it. In such as case, the shutter will not open and the picture will be missed. Finally, the use of the lens mounting plate to provide stability and support of the HEL can create vibrations in the plate that can transfer to the lens during the picture taking operation, thereby degrading the quality of the resulting image.

Of course, these problems could be solved by increasing the accuracy of parts and assembly, but such a solution would increase the cost of the camera.

Clearly, there is a need for an HEL design which enhances the reliability and accuracy of the shutter of a simple, inexpensive camera without significantly increasing the need for parts of tighter tolerances and the consequent increase of manufacture. Ideally, such an HEL design should enhance the performance of the camera as a whole, while simplifying its structure and assembly costs.

SUMMARY OF THE INVENTION

Generally speaking, the invention is a shutter mechanism for a low-cost camera that overcomes the previously mentioned shortcomings. To this end, the shutter mechanism comprises an HEL that includes an arm rotatably mounted to the camera frame, and a finger projecting from the end of the arm that moves across an arcuate path; a shutter blade pivotally mounted on the camera frame having a lever portion for pivoting a masking portion into an exposure position when struck by the finger of the HEL; and a retainer integrally connected to the frame for retaining the finger in a shutter-striking arcuate path when the arm of the HEL rotates.

The finger may include a lower edge for striking the lower edge of the shutter blade, and an upper edge, and the retainer may include a wall for retaining the upper edge of the finger throughout its lever-striking path. Preferably, the retaining wall is arcuate in shape, and is integrally connected on opposite ends to the frame of the camera. To minimize friction between the retaining wall and the finger, the upper edge of the finger may include an engagement portion in the form of a rounded projection that slidably engages the lower surface of the retainer wall.

To minimize unwanted flexing of the HEL during the shutter striking operation, the length of the HEL arm from its upper to its lower end is no more than three times the length of the finger that projects from the lower end of the arm. The upper end of the arm may be integrally connected to a rotatable mounting, and the length of the arm between the rotatable mounting and the upper edge of the projecting finger is preferably shorter than the length than the finger that projects from the lower end of the arm.

The integral connection between the retainer wall and the camera frame provides a track-like structure that accurately and reliably guides and maintains the projecting finger of the HEL in a shutter-striking path throughout the lifetime of the camera. The relatively short length of the arm of the HEL relative to its shutter-striking finger minimizes unwanted flexing of the HEL during the shutter-striking operation, thus reducing dimensional variations in the HEL and further contributing to a reliable and accurate shutter operation.

BRIEF DESCRIPTION OF THE DRAWINGS

FIG. 4 is an enlarged front view of the shutter mechanism illustrated in FIG. 1 shown without the HEL or the shutter blade to better portray the HEL retainer of the shutter mechanism;

FIG. 5 is an elevational view of the shutter mechanism illustrated in FIG. 4 along the line 5—5.

DETAILED DESCRIPTION OF THE INVENTION

Figure 1:
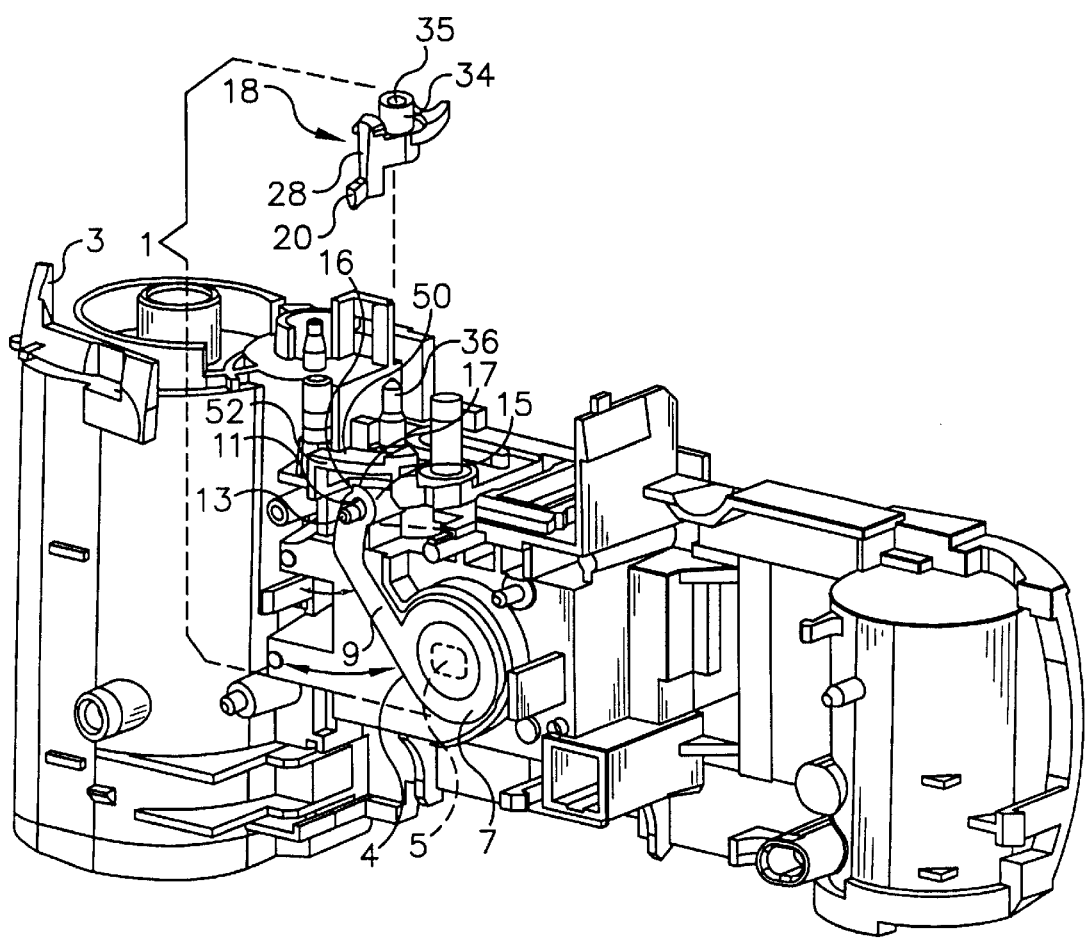
FIG. 1 is an exploded, perspective view of the shutter mechanism of the invention, illustrating how it is assembled into the molded frame of an inexpensive camera.
Figure 6:
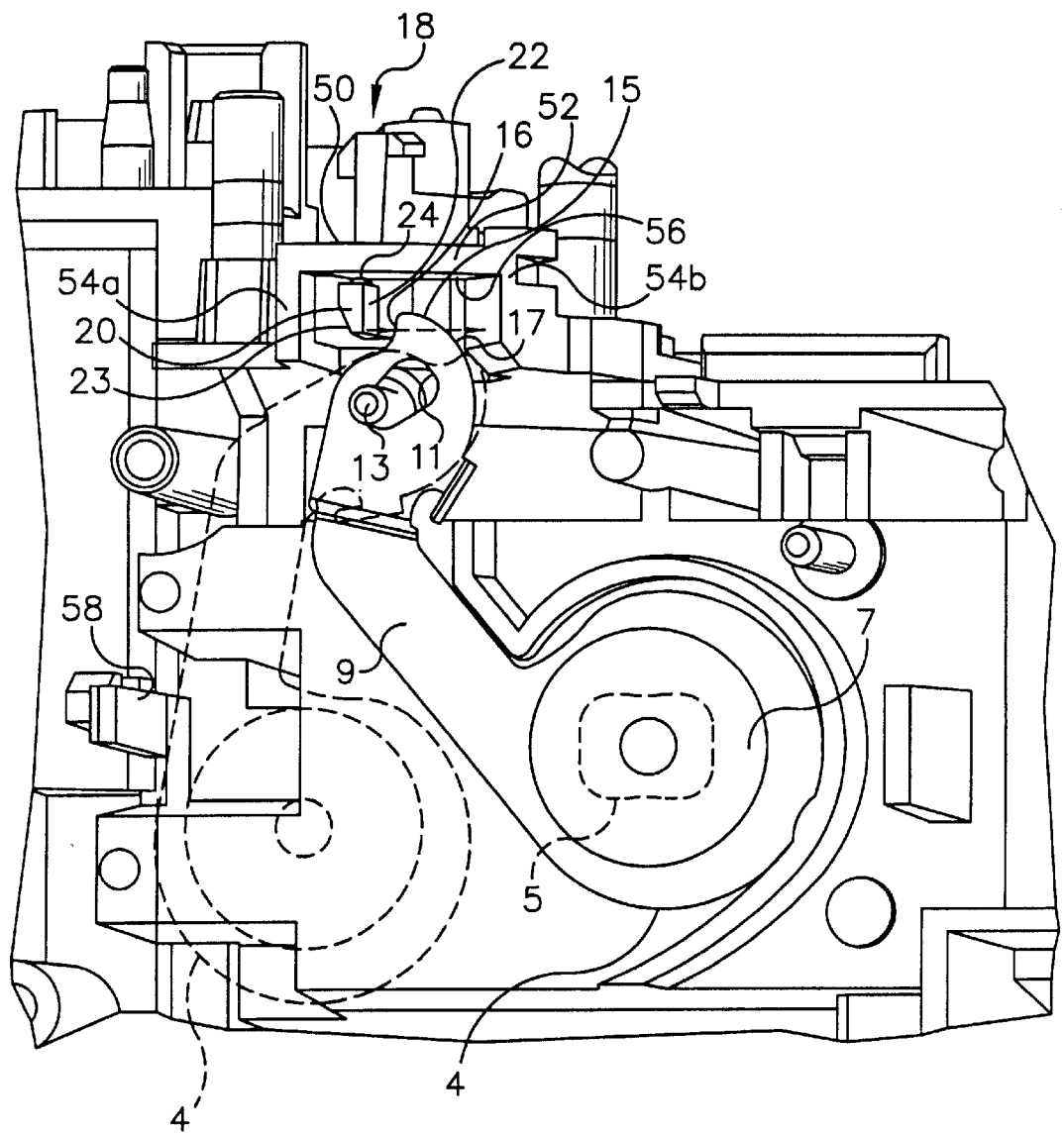
FIG. 6 is an enlarged, assembled view of the shutter mechanism illustrated in FIG. 1 demonstrating how the finger of the HEL is guided along an arcuate path by the HEL retainer to strike the lever portion of the shutter blade to effect an exposure.

With reference to FIG. 1, wherein like numerals designate like components throughout all of the several figures, the invention is a shutter mechanism 1 of the illustrative embodiments is particularly adapted for use in an integrally molded, plastic frame 3 of an inexpensive camera. In such cameras, a shutter blade 4 is spring biased into a light-blocking position over an aperture 5 as illustrated in FIG. 1. The purpose of the shutter mechanism 1 is to momentarily pivot the circular mask 7 of the blade 4 away from the light aperture 5 so that a portion of light sensitive film (not shown) stretched across the backside of the camera frame 3 will momentarily receive a focused image from a lens assembly (also not shown) mounted behind the blade 4. To this end, the circular mask 7 of the shutter blade 4 is connected to an arm 9 having a cam opening 11 that receives a post 13. The arm 9 terminates in a short lever portion 15 disposed just above the post 13. As is best seen in FIG. 6, the lever portion 15 includes both a relatively straight striking surface 16 on its left side, and a rounded cam surface 17 on its right side. When the surface 16 of the lever portion 15 is struck by another component of the spring loaded shutter mechanism 1, the arm 9 of the shutter blade 4 is pivoted along the arcuate path illustrated in FIG. 1 into the position indicated by dashed lines in FIG. 6 in order to allow light to pass through the aperture 5.

Figure 2:
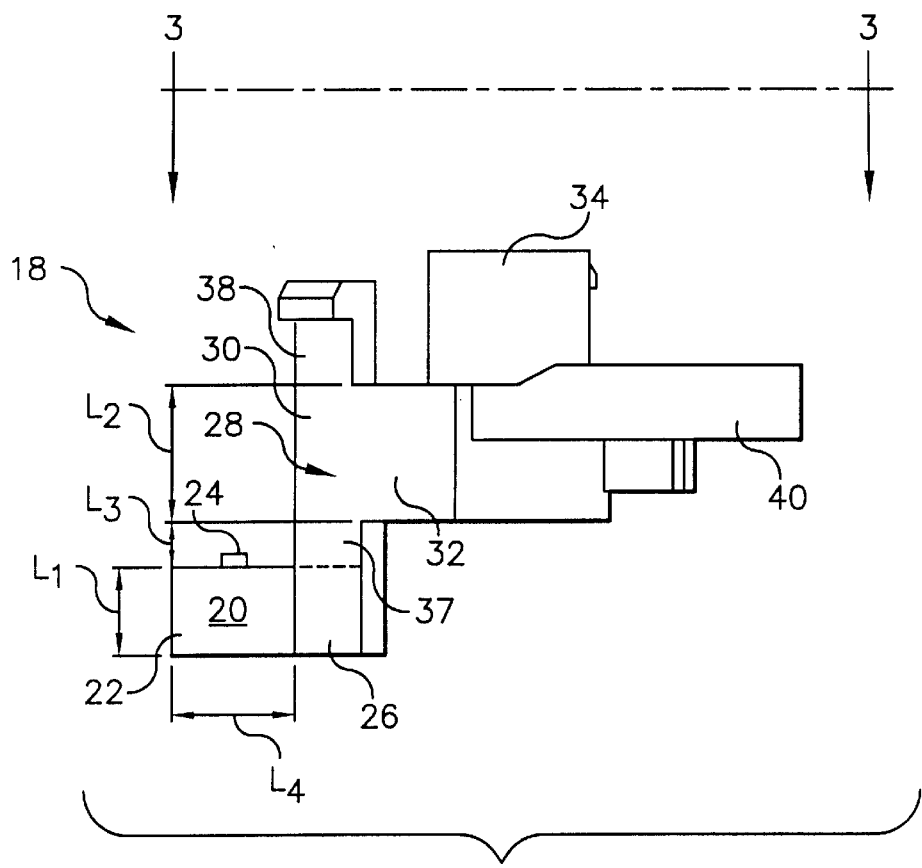
FIG. 2 is a side view of the high energy lever (HEL) of the shutter mechanism, illustrating the relative proportions between the length of the lever finger and the length of the support arm.
Figure 3:
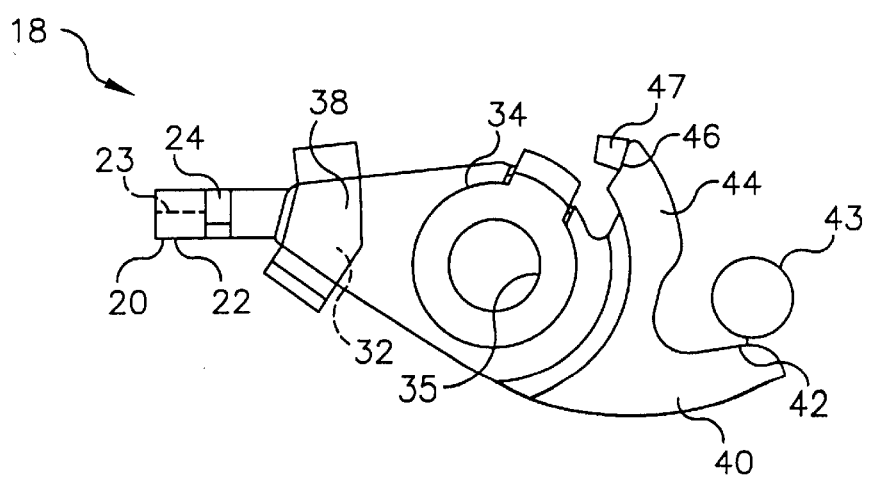
FIG. 3 is an elevational view of the HEL illustrated in FIG. 2 along the line 3—3.

With reference now to FIGS. 1, 2, and 3, the shutter mechanism 1 of the illustrative embodiment includes a high energy lever 18 (hereinafter referred to as the HEL) having a finger 20 for striking the surface 16 of the arm 9 of the shutter blade 4. Specifically, the finger 20 of the HEL 18 includes a straight, lever-striking side wall 22 for impacting the surface 16 of the blade 4, and a cam engaging inclined side opposite from side wall 22 for engaging the rounded cam surface 17 of the shutter blade 4 on the return stroke of the finger 20. A rounded projection 24 is disposed along the upper edge of the finger 20 for slidably engaging the lower surface of an HEL retainer 50 discussed in more detail hereinafter. The finger 20 is integrally connected in cantilever fashion to the lower end 26 of support arm 28. The upper end 30 of the arm 28 is integrally connected to a bushing 34 via integral portion 32. Bushing 34 has an inner diameter 35 which receives mounting post 36 (shown in FIG. 1) when the HEL is assembled into an operating position on the camera frame 3. Arm 28 has a middle portion 37 defined between the upper edge of the finger 20 and the lower edge of the integrally connected portion 32 (as best seen in FIG. 2). A spring retainer 38 is integrally connected to and extends upwardly from the edge of the upper end 30 of the support arm 28. The purpose of the spring retainer 38 is to retain one end of a torsion spring which circumscribes the bushing 34 and biases the finger 20 in the direction illustrated by the arrows in FIG. 6.

With reference now in particular to FIG. 3, the HEL further includes a cam follower arm 40 having an inner surface 42 that engages the lobe of a cam 43 in order to cock the HEL into the position illustrated in FIG. 6 against the bias of the unillustrated torsion spring. The HEL further includes a latch 44 having a surface 46 which engages a shutter release 47 when the HEL is cocked into the position shown in FIG. 6.

The relative dimensions between the finger 20 and various portions of the support arm 28 of the HEL have been chosen to minimize the probability of shutter failure due to relative flexure between the arm 28 and finger 20 as the finger 20 strikes the lever portion 15 of the shutter blade 4. FIG. 2 illustrates that the total length L of the support arm 28 (which is formed from lengths $L_1+L_2+L_3$) is only about 2.30 times the length $L_4$ of the finger 20. Additionally, the length $L_3$ of the middle portion 37 of the support arm 28 defined between the lower edge of the integrally connected portion 32 and the upper edge of the finger 20 is only about 30% as great as the $L_4$ of the finger 20. The relatively thick and compact dimensioning of the support arm 28 relative to the finger 20, in combination with the short length of the middle portion 37 of the arm 28, provide an HEL which, although integrally molded from a flexible plastic material, will rigidly resist unwanted torsional and shear flexure between the finger 20 and the arm 28 when the unillustrated torsion spring that surrounds the bushing 34 sweeps the finger 20 in an arcuate path that strikes the surface 16 of the lever portion 15 of shutter blade 4.

With reference now to FIGS. 4 and 5, the shutter mechanism 1 further includes an HEL retainer 50 that engages the rounded projection 24 of the finger 20 during the exposure operation to guide and maintain the finger 20 in captive fashion so that the finger 20 will not slip above the lever portion 15 of the shutter blade 4 and thereby cause a failure of the shutter mechanism 1. To this end, the HEL retainer 50 includes an arcuate retainer wall 52 which is integrally formed into the camera frame 3 by means of integral brackets 54a, b. The bottom surface 56 of the arcuate retainer wall 52 provides the guide surface for the rounded projection 24 of HEL finger 20 during the operation of the shutter mechanism 1. As can be appreciated best in FIGS. 4 and 5, the integral brackets 54a, b essentially render the retainer wall 52 as part of the frame 3 of the camera Hence, the retainer wall 52 provides a positive and vibration free guide for the finger 20 of the HEL which is formed in precisely the right place when the camera frame 3 is initially molded. The fact that the HEL retainer 50 is integrally formed along with the frame 3 is highly advantageous, as it obviates the need for the assembly of a separate part which may not be secured in its proper position during assembly, or which may shift from its proper position as a result of vibration caused by the operation of the camera.

FIG. 6 illustrates the operation of the shutter mechanism 1. In this Figure, the HEL is illustrated in a "cocked" position. In such a position, the HEL would be pivoted against the bias of a torsion spring (not shown) and latched into the position illustrated in FIG. 6 by the action of a shutter release (also not shown) acting against previously discussed surface 46 of latch 44. When the button of the shutter mechanism is depressed by the camera operator, the shutter release frees the latch 44, thereby allowing the torsion spring to rapidly snap the finger 20 in the arcuate path illustrated by the dotted arrow.

A little less than one-third of the way through this path, the lever striking flat side 22 of the finger 20 hits the striking surface 16 of the lever portion 15 of shutter blade 4, thereby pivoting the shutter blade 4 into the position illustrated by dashed lines. When so pivoted, the shutter blade 4 strikes terminal 58, thereby actuating the electronic flash (not shown). After striking terminal 58, the biasing spring (not shown) of the shutter blade 4 then proceeds to pivot it back to the position illustrated in FIG. 6. All during this operation, it should be noted that the lower surface 56 of the wall 52 of HEL retainer 50 captively engages the upper edge of the HEL finger 20 via rounded projection 24, thereby preventing the finger from rising upwardly and missing the striking surface 16 of the shutter blade 4.

After the exposure operation is complete, the camera operator advances the film in the camera, which in turn causes a drive train to engage a cam lobe against surface 42 of the HEL. This in turn causes the HEL to pivot in the direction opposite from that indicated in the arrow in FIG. 6. As the finger 20 of the HEL sweeps backward, the inclined side 23 of the finger 20 engages cam surface 17 of the lever portion 15 of blade 4, thereby momentarily pushing the arm 9 of the blade 4 downwardly so that the finger 20 can get past the lever portion 15 and back into the position illustrated in FIG. 6. This downward movement of the arm 9 of the shutter blade 4 is made possible by the fact that the cam opening 11 at the upper end of the arm 9 is larger than the outer diameter of the pivot post 13. When the finger 20 is brought completely back into the position illustrated in FIG. 6, the unillustrated shutter release again latches onto surface 46, and the entire operation may again be repeated to expose a different section of the film behind the aperture 5.

While this invention has been described with respect to a preferred embodiment, various modifications and additions may become apparent to persons of ordinary skill in the art. For example, both the shape, proportion, and inner engagements between the upper edge of the finger 20 and the lower surface 56 of the retainer wall may be made without departing from the scope of the invention. All such modifications, variations, and additions are intended to be encompassed within the scope of this patent application, which is more specifically defined by the claims appended hereto. cl PARTS LIST 1 Shutter mechanism
3 Camera frame
4 Shutter blade
5 Light Aperture
7 Circular mask
9 Arm
11 Cam opening
13 Post-Shutter Blade
15 Lever portion
16 Striking surface
17 Cam surface
18 HEL
20 Finger
22 Lever striking flat side
23 Cam engaging inclined side
24 Rounded projection
26 Lower end
28 Support arm
30 Upper end
32 Integrally connected portion
34 Bushing
35 Inner diameter-Bearing
36 Mounting post-H.E.L.
37 Middle portion of arm
38 Spring retainer
40 Cam follower arm
42 Inner surface
43 Cam
44 Latch
46 Latching surface
47 Shutter release
50 HEL retainer
52 Retainer wall
54 Brackets a, b
56 Bottom surface of wall 52
58 Flash contact

What is claimed is:

1. A shutter mechanism for a camera without a lens mounting plate, said camera having a frame, said shutter mechanism comprising:

an HEL including an arm rotatably mounted to said frame, and a finger projecting from an end of said arm that moves across an arcuate path when said arm rotates;

a shutter blade pivotally mounted on said frame having a lever portion for pivoting a masking portion into an exposure position when struck by said finger; and a retainer integrally formed on said frame for retaining said finger in a shutter-striking arcuate path when said arm rotates.

2. The shutter mechanism defined in claim 1, wherein said retainer includes a retaining wall that retains an edge of said finger as said finger moves along said shutter-striking arcuate path.

3. The shutter mechanism defined in claim 2, wherein said finger has a lower edge for striking said lever portion of said shutter blade, and an upper edge, and said retaining wall retains said upper edge throughout said shutter-striking arcuate path.

4. The shutter mechanism defined in claim 2, wherein said retaining wall is arcuate in shape, and said retainer includes support brackets integrally connecting opposite ends of said retaining walls to said frame.

5. The shutter mechanism of claim 3, wherein said upper edge of said finger includes an engagement portion slidably engaging said retainer wall.

6. The shutter mechanism of claim 5, wherein said engagement portion includes a rounded projection for reducing friction between said upper edge of said finger and said retainer wall.

7. The shutter mechanism of claim 1, wherein said arm of said HEL includes an upper end integrally connected to a bushing that is journaled onto a post projecting from said frame, and a lower end integrally connected to said finger.

8. The shutter mechanism defined in claim 1, wherein the length of said arm from said upper to said lower end is no more than trice a length that said finger projects from said lower end of said arm.

9. The shutter mechanism defined in claim 1, wherein said arm includes an upper end connected to a rotatable mounting, and a lower end connected to said projecting finger, and wherein a length of said arm between said upper end of said arm and an upper edge of said projecting finger is shorter than a length that said finger projects from said lower end of said arm.

10. The shutter mechanism defined in claim 1, wherein said shutter blade is pivotally mounted at a point between said lever portion and said masking portion.

11. The shutter mechanism for a camera having an integrally molded frame, comprising:

an HEL including an arm having an upper end rotatably mounted to said frame, and a lower end, and a finger projecting from said lower end of said arm that moves across an arcuate path when said upper end of said arm rotates;

a shutter blade pivotally mounted on said frame having a lever portion for pivoting a masking portion into an exposure position when struck by said finger; and a retainer integral with said frame, said retainer including a retaining wall that retains an edge of said finger for maintaining said finger along a shutter-striking arcuate path when said arm rotates.

12. The shutter mechanism defined in claim 11, wherein said finger has a lower edge for striking said lever portion of said shutter blade, and an upper edge, and said retaining wall retains said upper edge throughout said shutter-striking arcuate path.

13. The shutter mechanism defined in claim 11, wherein said retaining wall is arcuate in shape, and said retainer includes support brackets for integrally connecting opposite ends of said retaining walls to said frame.

14. The shutter mechanism of claim 13, wherein said upper edge of said finger includes an engagement portion for slidably engaging said retainer wall.

15. The shutter mechanism of claim 11, wherein said arm of said HEL includes an upper end integrally connected to a bushing that is journaled onto a post projecting from said frame, and a lower end integrally connected to said finger.

16. The shutter mechanism defined in claim 11, wherein the length of said arm from said upper to said lower end is no more than trice a length that said finger projects from said lower end of said arm.

17. The shutter mechanism defined in claim 11, wherein said arm includes an upper end connected to a rotatable mounting, and a lower end connected to said projecting finger, and wherein a length of said arm between said upper end of said arm and an upper edge of said projecting finger is shorter than a length that said finger projects from said lower end of said arm.

18. The shutter mechanism for a camera having an integrally molded plastic frame, comprising:

an HEL including an arm having an upper end integrally connected to a bushing member rotatably mounted to said frame, and a lower end and a finger projecting from and integrally connected to said lower end of said arm, wherein a length between said integral connection at said upper end of said arm and an upper edge of said finger is less than a length that said finger projects from said arm;

a shutter blade pivotally mounted on said frame having a lever portion for pivoting a masking portion into an exposure position when struck by said finger, and a retainer connected to said frame for retaining said finger in a shutter-striking arcuate path when said arm rotates.

19. The shutter mechanism defined in claim 18, wherein said retainer includes a retaining wall integrally connected to said frame that retains an edge of said finger as said finger moves along said shutter-striking arcuate path.

20. The shutter mechanism defined in claim 19, wherein said retaining wall is arcuate in shape, and said retainer includes support brackets for integrally connecting opposite ends of said retaining walls to said frame.

* * * * *